United States Patent

[11] 3,578,996

| [72] | Inventor | Lewis Balamuth<br>New York, N.Y. |
|---|---|---|
| [21] | Appl. No. | 1,125 |
| [22] | Filed | Jan. 7, 1970 |
| [45] | Patented | May 18, 1971 |
| [73] | Assignee | Ultrasonic Systems, Inc.<br>Farmingdale, N.Y. |

[54] ULTRASONIC MOTOR
32 Claims, 15 Drawing Figs.

[52] U.S. Cl. ............................................. 310/8.7,
310/8.2, 310/9.1, 310/26
[51] Int. Cl. ............................................. H01v 7/00
[50] Field of Search............................................. 310/8.1,
8.2, 8.3, 8.4, 8.7, 9.1, 26, 8.8; 51/317, 59

[56] References Cited
UNITED STATES PATENTS

| 3,368,085 | 2/1968 | McMaster et al. | 310/8.3 |
| 2,514,080 | 7/1950 | Mason | 310/8.7X |
| 2,895,061 | 7/1959 | Probus | 310/8.7X |
| RE25,433 | 8/1963 | Rich | 310/8.7X |
| RE25,033 | 8/1961 | Balamuth et al. | 51/317 |
| 2,866,911 | 12/1958 | Rawding | 310/26 |
| 3,148,289 | 9/1964 | Pijls et al. | 310/8.7X |
| 2,947,886 | 8/1960 | McGunigle | 310/8.3 |
| 3,252,336 | 5/1966 | Eisner | 310/8.7X |

Primary Examiner—Milton O. Hirshfield
Assistant Examiner—B. A. Reynolds
Attorney—Leonard W. Suroff ABSTRACT: An ultrasonic motor having a transducer confined at or near a nodal region of vibration sandwiched between two flanged sections, each flanged section consisting of an elongated member whose average cross section is substantially less than the cross section of the transducer, and the transducer is rigidly coupled to the flanged sections.

Patented May 18, 1971

INVENTOR.
LEWIS BALAMUTH

BY
Leonard W. Auroff
ATTORNEY

Patented May 18, 1971
3,578,996
4 Sheets-Sheet 2
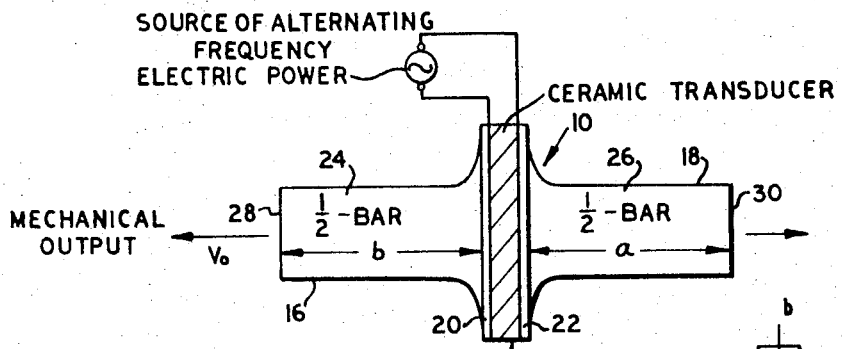
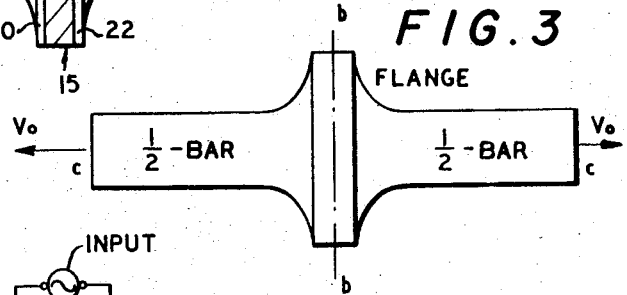
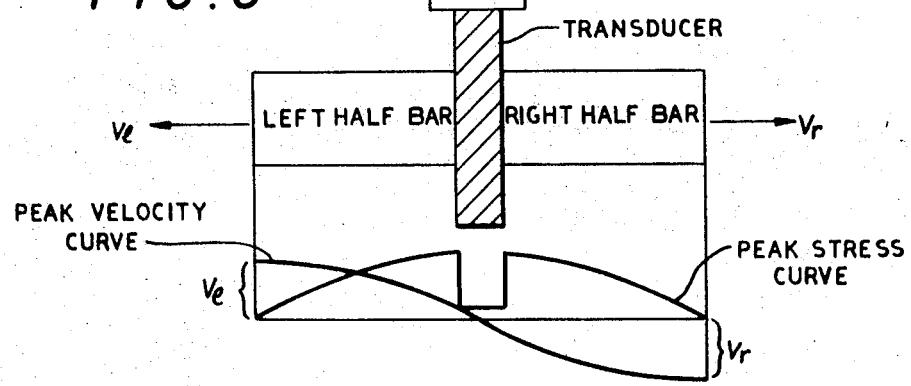
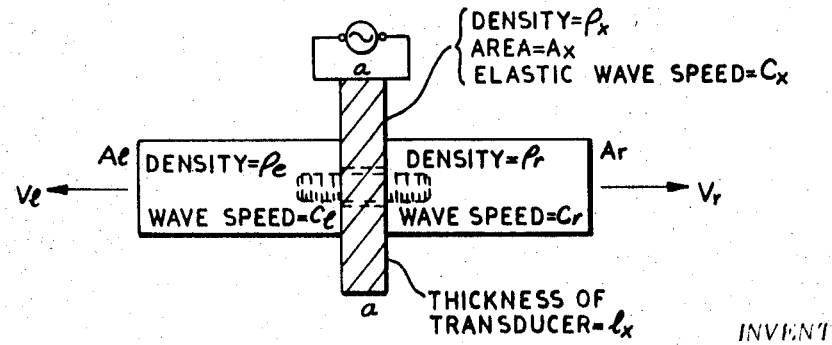
INVENTOR.
LEWIS BALAMUTH
BY
Leonard W Suroff
ATTORNEY Patented May 18, 1971 3,578,996

INVENTOR.
LEWIS BALAMUTH
BY
Leonard W. Suroff
ATTORNEY

INVENTOR.
LEWIS BALAMUTH
BY
Leonard W. Auroff
ATTORNEY

1

ULTRASONIC MOTOR

BACKGROUND OF THE INVENTION

This invention relates in general to compressional wave transducers, and more particularly, to piezoelectric sandwich transducers having enhanced vibration amplification.

In general an ultrasonic motor comprises a transducer (piezoelectric or magnetostrictive), an elastic wave carrying transmission line and an output tool or operative end. Ultrasonic motors are used at present in industry, medicine, dentistry and biology for a wide variety of purposes. In each instance of use the three component parts of the ultrasonic motor, as outlined above, require special consideration as to design, so as to perform best the required job to be done. Applicant has discovered a new design principle which is broad in scope and may be used in creating a number of types of novel ultrasonic motors to be herein described. Applicant's principle is best adapted to those users where a relatively large output stroke of the motor is desired. This, for example, is the case for ultrasonic dental drilling, ultrasonic dental periodontal and prophylaxis instruments, ultrasonic machine tools (both rotary and nonrotary), plastic and metal welding and forming equipment, insertion of metals into plastics, riveting and staking and in a great many other cases.

Now, to design an ultrasonic motor for a given end use, it is necessary to consider the power input, the frequency of operation, the output stroke, the support and housing of the vibrating portion of the motor, the mechanical stresses in various parts of the motor, the efficiency, and the relationship of the motor to its means of excitation. In be with the power input and the efficiency of the motor, it is to be recognized that the input power divides itself into (a) power lost in all internal dissipation mechanisms (i.e. these would include internal friction, electromagnetic losses, and mounting losses), (b) energy stored in the motor (note that once the output stroke is established the maintenance of this stored energy requires only a portion of the power included in (a) above, power delivered into the load. The relevance of these power components to our design procedures will lie set forth later in this specification.

As to the output stroke of the motor, we will first recognize that when the motor is idling (i.e. without application to a load) this stroke is directly related to the stored elastic energy in the motor. This stored energy is divided between the transducer and the transmission line-tool combination. Furthermore, we are considering ultrasonic motors whose idling condition is at a frequency at or near a natural resonance mode of vibration of the motor, and wherein there exists at least one approximate nodal region and two approximate loop regions of vibration. The vibrating motion of such a motor is such that the entire motor passes simultaneously at every point through a state of nearly zero motion or rest. This occurs just before the motor is about to reverse the direction of its vibration at every point. Similarly, the various parts of the motor pass simultaneously through peak velocities, the peak values being different at various points along the main axis of the motor structure, Hence, as is well known, it follows that the stored energy in the motor oscillates between all potential (elastic strain) energy and all kinetic energy. Since the total stored energy is constant for a constant input power, it therefore further follows that the peak stored elastic strain energy is equal in magnitude to the peak stored kinetic energy. It is from this simple and broad principle that applicant has discovered a simple and novel method for designing new types of ultrasonic motors of a certain generic class. The only additional factor which must be grasped clearly, in order to understand the application of the principle, is that the nodal and loop (antinodal) regions are fixed in the motor structure for a given mode of vibration and furthermore nodal regions, being at all times regions of small or zero motion are chiefly reservoirs of elastic strain energy, while loop (antinodal) regions are chiefly reservoirs of kinetic energy (since they are at all times regions of small elastic strain energy).

It is this inevitable separation in different parts of the motor structure of strain energy and kinetic energy which dictates the chief design criterion in all of the ultrasonic motors involved in this invention. Before proceeding further we should remember that the transducer part of a motor is active, in the sense that external energy is put into the transducer material and the transducer transforms some of this energy into stored mechanical vibrational energy. On the other hand, the transmission line section of the motor is passive, in the sense that it can only receive and transmit mechanical vibration energy for storage, dissipation, or use on an external load.

Now we are ready to formulate the central design principle of the invention. First, the motor design requires that the transducer be confined at or near a nodal region of vibration, while the transmission sections terminate at antinodal regions. Second, the transducer, along the motor axis, embraces substantially less than a quarter wave length at the operating frequency in the transducer material; at the same time the cross-sectional dimensions of the transducer are selected substantially larger than the average cross-sectional dimensions of the transmission lines. Third the output section of the transmission line is chosen so as to emphasize the output stroke of the motor and minimize the output mass of same.

The above principle is rather general, but it has the immediate and specific results when applied to simple cases of motor design. For example, let us consider a motor of minimal length, which would then have one nodal region and two antinodal regions at the design frequency of operation. Since the antinodal regions bracket the nodal region, our principle requires that the transducer section be located nodally between the antinodes. This further requires that the motor have two possible output ends, i.e. at either of the two antinodal regions. Furthermore, the two antinodal transmission sections, in accordance with the second point of out design principle, are made substantially smaller in cross section than the cross section of the transducer section. Schematically, this means out generic-type of motor would include a central transducer portion having a nodal region and a first or right transmission line secured to the transducer at one end thereof and having a free end which is an antinodal, or loop region. A second or left transmission line is secured to the opposite side of the transducer having a free end which is similarly an antinodal, or loop, region.

Before presenting actual mathematical design formulae, which tend to obscure the broad simple principles herein being presented, let us note some of the unique and hitherto unappreciated design flexibility exhibited in the generic-type of ultrasonic motor. Normally, for highly efficient ultrasonic motors the transducer, whether magnetostrictive or piezoelectric, is preferably a ceramic body having inherently low electromagnetic losses. When the motor vibrates alternating stresses are set up and are maximal in the nodal region. But the strength of the ceramics and especially of the bonding agents (i.e. to bond the metal transmission lines to the ceramic transducer body) are limited and it is essential to design the motor so that these stresses will not be exceeded in regular operation. Now, once the input power to the motor is decided on, this will determine what the peak stresses will be in the motor as well as the peak output strokes, once the motor dimensions and materials have been established and specified. Here, we must remember that the stored elastic strain energy will be concentrated in the antinodal regions. But since we have selected the transducer (the nodal region) section to be of large cross section (relatively) we can, for a given power input, make that cross section such that the alternating peak stresses generated during operation will be below safety limits set for the materials of this part of the motor. This is possible because the stress is the alternating force generated by the motor action divided by the cross section of the transducer. In essence the alternating force is determined by the input power to the transducer, but the alternating stress is determined by the ratio of the force to the cross section.

Having seen how to constrain the peak stresses in the motor by suitable selection of power input and transducer cross section, we can proceed to beautifully simple consequence that the output stroke at either output loop of each transmission line depends on the average mass of the corresponding transmission line. This follows from the above cited principles because the peak stored kinetic energy of the motor is concentrated in the antinodal regions and consequently since the nodal and antinodal regions are spatially separated, their cross-sectional dimensions may be selected independently. So, by selecting transmission lines of small (relative) cross sections we are able to get large output strokes. In fact, it should be evident that for a given transducer size and power input, one can select the output transmission line section so as to produce any desired stroke. However, there is a practical limitation, and this is the endurance limit of the material of the transmission line. For the largest output stroke it is preferred to use a titanium alloy transmission line, but quite adequate working strokes are attainable with any metals of good mechanical Q. Such metals include steel, monel, dural, brass and beryllium-copper. Thus, it is seen that the design principles herein disclosed permit in a general way a very simple approach to the design of practical ultrasonic motors, whereby stress-limitations in the transducer and stroke limitations in the transmission lines may be handled dimensionally independently one from the other. Note that the connecting key which permits the noted design flexibility is the fact that the peak elastic strain energy (confined chiefly to the transducer) and the peak kinetic energy (confined chiefly to the transmission lines) are equal.

In designing and operating motors of the generic-type discussed above, applicant has further discovered that for torsional and longitudinal-types of vibration (i.e. in torsional-type ultrasonic motors and longitudinal vibration-type ultrasonic motors) that the right and left transmission lines are each very closely equal to a quarter wavelength at the motor operating frequency in the transmission line material provided that the cross section of the transducer is substantially greater than the cross section of the transmission line. This is so as long as the cross section ratio is more than two to one. Strictly speaking, it is the characteristic impedance ration which should be taken in an actual case.

OBJECTS OF THE INVENTION

An object of the invention is to provide an improved construction for an ultrasonic motor.

Another object of the invention is to provide a new and improved structural arrangement of an electromechanical transducer.

Other objects of the invention will become obvious as the disclosure proceeds.

SUMMARY OF THE INVENTION

The ultrasonic motor of the present invention includes a transducer sandwiched between two transmission sections having a flanged portion at one end thereof adjacent said transducer with an elongated portion or member extending therefrom to its free end. The average cross section of the elongated portions being substantially less than the cross section of the transducer, with the transducer rigidly coupled to the flanged sections.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3, is a diagrammatic view of an ultrasonic motor incorporating the principles of the present invention;

FIG. 5, illustrates a schematic design for an ultrasonic motor of high peak velocity output while maintaining safe stress levels in the transducer region;

FIG. 6, illustrates the motor of FIG. 5 without the flanges;

FIG. 7, illustrates a schematic design indicating the various relevant dimensions and data for a case of a motor operating with compressional waves of longitudinal vibrations;

PREFERRED EMBODIMENTS

Figure 4:
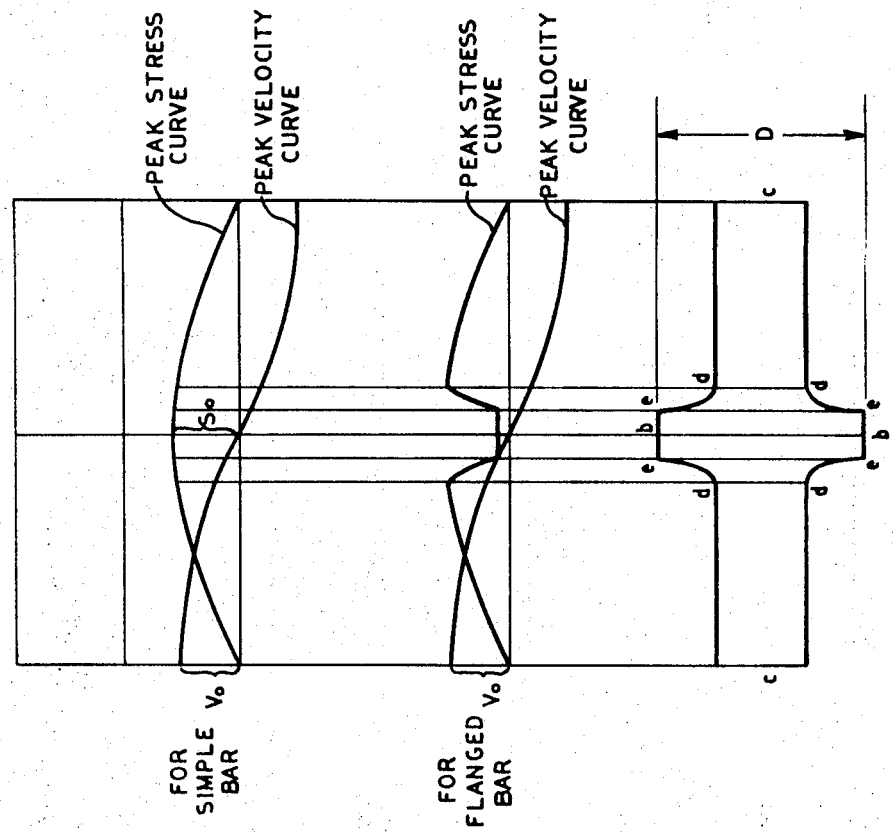
FIG. 4, shows graphically the effect of introducing a flange where the peak velocity is maintained the same in both the flanged and unflanged bar sections.

Ultrasonic technology, as somewhat discussed above, in sonic power applications requires as its most basic element one or more ultrasonic motors, which provide the sonic (ultrasonic) energy needed to process the designated load. The evolution of this technology in recent years has resulted in two widely used types of motors. One-type relates to those applications where the output stroke capability of the transducer alone is not sufficient to produce the desired results in the load. This has reference, for example, to ultrasonic machining, metal welding, metal forming and extrusion, plastic joining and assembly methods, and in medical and dental procedures of certain kinds. In order to provide the increased amplitude or velocity of output of the motor, the generally accepted method has been to add to the transducer assembly a horn, or more technically a mechanical impedance transformer, which provided the necessary amplification of the motion of the transducer. The transducer in such cases is generally either a half wavelength resonant structure comprised of nickel laminations or a ferrite bar, or it is a half wavelength composite (what is called a "sandwich") structure comprising a sandwich of piezoelectric ceramic between two metal sections. The second widely used type of motor is found in ultrasonic tank cleaners. The motor in this case may be either a suitable piezoelectric ceramic block or a magnetostrictive ceramic block which is cemented to the cleaning tank wall, whereby it vibrates the tank and its liquid contents when energized. In many cases the piezoelectric transducer cemented to the tank is a sandwich structure of the type described above in connection with motors employing an added horn. Generally speaking the sandwich constructions are characterized by having a high level of efficiency and by the fact that they are operated at a resonant frequency of vibrations of the sandwich structure.

A recent advance in the art of designing the first type of motor described for machining, welding, forming, etc. applications has been made by incorporating a piezoelectric ceramic transducer integrally with the structure of an amplifying horn, whereby it is maintained that the amplifying characteristics of the horn are obtained within a single half wavelength structure. This, thereby avoids the need to employ a half wave transducer feeding into a half wave mechanical amplifier or horn. It is essentially a blend of the sandwich idea with the horn concept of amplification.

The present invention relates to the design of sandwich-type ultrasonic motors and discloses how the use of an amplifying horn is not at all necessary to produce high speed outputs from compactly designed motors. The disclosure will set forth in detail the basic theory of a simple class of sandwich type ultrasonic motors and will show how this theory serves as an adequate guide in the design of compact motors for general use.

Suppose we wish to supply a specified peak amplitude of vibration to an output area of specified dimensions. We will take a bar whose cross section equals the specified output area dimensions and whose length is one half wave length at the proposed frequency of operation in the material of said bar. Now, if this bar is vibrating in a standing wave pattern such that the central or midsection is a nodal plane of motion and the end surfaces are loops or antinodal planes of motion, we would have achieved our objective stated above provided the output amplitude is as desired. According to the prior art as outlined above one could achieve the desired objective by coupling the bar at one end to an ultrasonic motor whose output has the desired peak amplitude of vibrations. Such a motor, for example, could be of the type described in U.S. Pat. No. Re. 25,033 wherein applicant is a coinventor, or it might be of the type illustrated in U.S. Pat. No. 3,328,610, or it could be as described in U.S. Pat. No. 3,368,085. These patents are cited because they each disclose useful embodiments of prior art high amplitude ultrasonic motors based on the different principles of design cited above.

Before describing applicant's description of the solution to the above stated problem, let us review briefly some of the characteristic features of the half wave bar vibrating in a substantially standing wave pattern. What is usually presented in the analysis of a half wave bar is the distribution of stress and displacement, as illustrated in FIG. 1, in addition applicant has added data showing how the peak kinetic energy and peak potential (elastic strain) energy are distributed along such a bar.

Figure 1:
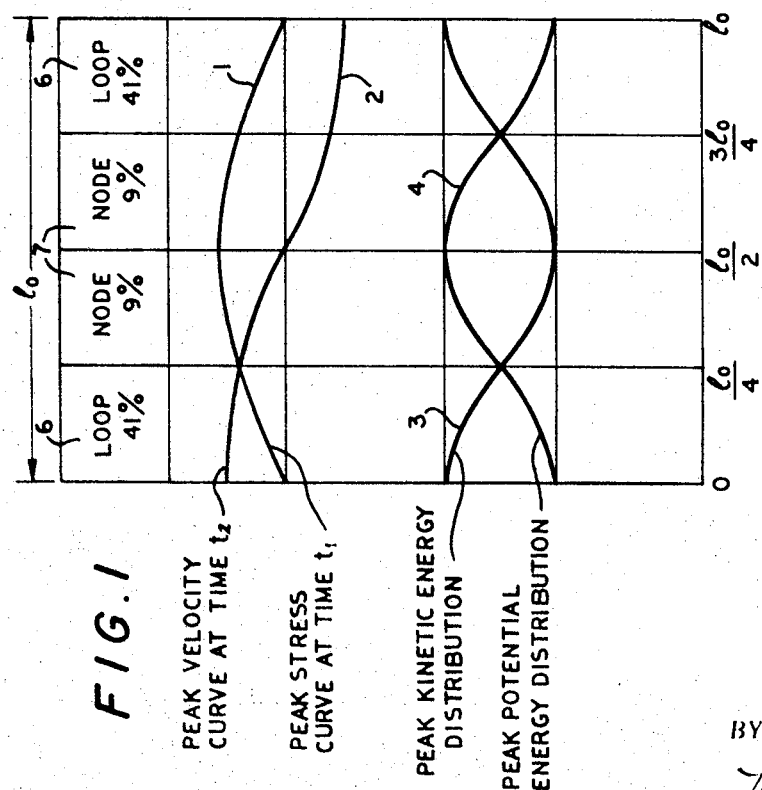
FIG. 1, is a graph displaying the important dynamical data relevant to a half wave bar vibrating at its fundamental resonance frequency in a standing wave pattern.

FIG. 1, is an attempt to summarize most of the important dynamical data relevant to a half wave bar vibrating at its fundamental resonance frequency, $f_o$, in a standing wave pattern. Curve 1 shows the peak dynamic stress in the bar at some time, say $t_1$. As time varies this peak stress at each point along the bar alternates in simple harmonic manner between its peak positive and peak negative value. As may be seen the stress is at all times relatively small in the neighborhood of the loops of motion of the bar. At the same time, the peak velocities of the various sections of the bar are also varying in time in simple harmonic fashion and these velocities are at all times relatively small in the neighborhood of the nodal plane of motion. As a consequence of this polarization of velocity and stress values in different regions of the bar, it follows that the peak kinetic and potential energy distribution in the bar will shown a similar polarization. This is, in fact, true and the distribution curves for the kinetic and potential energy are shown in FIG. 1 as curves 3 and 4. The results for the peak kinetic energy are shown in regions 6 and 7 of the bar. Thus, we see that 41 percent of the peak kinetic energy concentrates in one-quarter of the bar at one end. Taking both ends into account, 82 percent of the peak kinetic energy is then seen to be concentrated in the neighborhood of the loops of motion. Now the curves 3 and 4 are inversely identical in shape so that it follows that 82 percent of the peak potential energy concentrates around the nodal region of the bar. These polarizations of peak kinetic and potential energies of the dynamic vibratory motion of a bar are basic to the teaching of art in this invention, as will be presently made evident. Of course, as is required by the principle of the conservation of energy the areas under the peak kinetic energy and peak potential energy curves are equal, or, in other words, the peak potential energy and the peak kinetic energy are equal. At any time other than when a peak value is reached the sum of kinetic and potential energies of the bar is constant and, of necessity, this sum equals either the peak kinetic energy or the peak potential energy. The actual value of the peak kinetic energy is (A) peak kinetic energy $= \frac{1}{4} M V_o^2$ $M$ = mass of bar $V_0$ = peak velocity at either end.

Now let us return to the problem posed earlier, namely, how to realize a specified value of $V_o$ at the output section of a bar. Evidently, somehow an amount of energy equal to $\frac{1}{4} M V_o^2$ must be supplied to the bar and the deed is accomplished. But, if the bar produces internal dissipation of energy and if the bar is loaded externally, this energy will be quickly used up and the motion of the bar will damp down to zero. To prevent this some source of power must be coupled to the bar so as to renew the energy being consumed. This, of course, is the role of the transducer used ultrasonic motors, and as has been outlined above may be coupled by attachment to the surface of the bar or by incorporation in the bar (sandwich construction).

In the subject invention it is proposed to resort to the sandwich-type of construction in order to get the necessary power supplied to the motor. Now, since both piezoelectric and magnetostrictive materials transform electromagnetic energy into mechanical energy by a mechanism of strain production in these materials, it is most effective to insert the transducer material preferably in a region of high average stress or strain. This is what is done in most sandwich type ultrasonic motors in the prior art.

Figure 2:
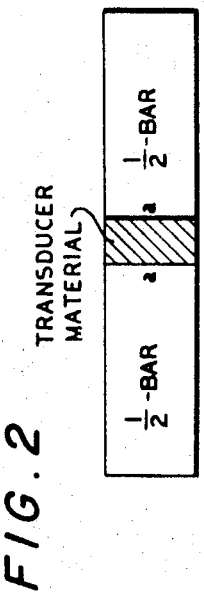
FIG. 2, is a diagrammatic view of an ultrasonic transducer.

In FIG. 2 is shown the bar of FIG. 1 cut in half and centrally attached to two faces of a transducer. For purposes of being specific, let the transducer be a piezoelectric ceramic, such as a lead zirconate compound known in the trade as PZT-4, with metallized surfaces $a-a$ across which an alternating potential difference may be applied. It would now seem that our original problem is solved, namely supply adequate power to the transducer to result in the storage of a peak kinetic energy which corresponds to an output peak velocity of the magnitude specified. This will, in fact, work if $V_o$ is small enough so that the stresses in the ceramic and in the bonded surface $a-a$ are supportable. But, actually, in the setup shown in FIG. 1, transducer and bonding limitations do not permit the generation of peak output velocities which are generally desired in the noncleaning power applications of ultrasonic motors. The only way out in the context of FIG. 2, and without resorting to amplifying horns is to somehow increase the power input to the transducer-bar system without violating stress and bonding limitations. At the same time it is desirable in general to do this without unduly increasing the potential difference across the transducer terminals. This requires that the thickness of the transducer be kept reasonably small, and so the only way to increase power input at specified stress levels, is to increase the volume of the transducer, which, due to thickness limitations, means increasing the area of the transducer. If we can increase the ares of the transducer and maintain satisfactory coupling conditions, then we have solved the problem of producing any desired peak output velocity limited only by the strength of the ½-bar materials. Fortunately, there is a happy resolution of all the design difficulties enumerated, by noting that the motion of the ends of a half wave is not much affected by adding mass in the neighborhood of the nodal region of the bar. For example, suppose we alter the bar as shown in FIG. 3. The flange shown is in the nodal region of the bar and in the preferred case, the plane $b-b$ is the nodal plane of motion of the bar. The diameter of the flange may be varied over a considerable range without affecting the motions at $c-c$. FIG. 4 shows graphically the effect of introducing a flange where $V_o$ is maintained the same in both the flanged and unflanged bar. It will be noted that the peak stress drops significantly in the body of the flange. This is the key to the solution of out problem. For we may now divide the bar along $b-b$ (median plane of flange) and insert a ceramic transducer plate of diameter D. Thus we have substantially increased the volume of the transducer while at the same time the stress level at which it may be operated, though still in the nodal region of the motor, is kept at a low level for an output velocity $V_o$. Hence FIG. 5 illustrates an ideal schematic design for an ultrasonic motor 10 of high peak velocity output, while maintaining safe stress levels in the transducer region 15.

Thus, for the first time in the art of ultrasonic motor design, a method has been disclosed for obtaining high velocity outputs without the need of amplifying horns of any kind. But, it should be emphasized that the conception advanced here is a generic one and is equally adaptable to compressional vibration, torsional vibrations, or flexural vibrations. The main idea is that the volume of the transducer material may be selected for a desired power input at operable stress levels, while the output sections of the motor may be selected independently so as to provide a desired output velocity. The net result is an ultrasonic motor whose compactness and lightness has not heretofore been possible. The reason the design principles apply to various types of vibrations is that the basic idea is an energy principle which recognizes the concentration of kinetic energy at antinodal regions of motion. And further the formula for kinetic energy always involves an inertial term and the square of a velocity term. The inertial term may be altered whereby the velocity term is either raised or lowered as desired provided the kinetic energy is maintained constant. It is this constancy and level of kinetic energy stored which is provided by suitable transducer insertion as indicated.

Now FIG. 5 is a representative embodiment of the motor 10 schematically and is seen to include transducer means 15 sandwiched between two transmission sections 16 and 18, with section 16 sometimes referred to as the output section and section 18 sometimes referred to as the rear section, for convenience purposes. Each transmission section has a flanged portion, indicated as 20 and 22, at one end thereof adjacent the transducer means 15 with an elongated portion or member, indicated as 24 and 26, extending therefrom to its free end, indicated as 28 and 30. The average cross section of the elongated portions 24 and 26 are different from and generally substantially less than the cross section of the transducer means 15. It will be appreciated that since only one end of the motor is used as the output, we are left with a second which may be modified for various other reasons related to improved motor technology. For example, we have problems of proper supports for the motor 10 and sometimes for the provision of feedback or monitoring signals which may be required for automatic regulation of the motor or for continuous recording, visual or otherwise, of the output velocity during actual use. In order to appreciate departures from the symmetrical structure shown in FIG. 5, for the aforesaid purposes of regulation and monitoring, we need to appreciate more intimately the role played by the rear section 18 of the sandwich motor construction. For example, what are the effects arising from altering such items as the material, length or cross section of the rear section? In preferred embodiments of the invention the nodal plane of the motor coincides with the median plane of the transducer, although it will be appreciated that departures from this condition may easily be tolerated without greatly changing the output characteristics of the motor.

In any case, for all designs the total momentum of the motor must at all times equal zero. This is an inherent condition of all ultrasonic motors by virtue of the fact that their motion is reciprocal on two sides of a nodal plane. Now suppose the half bar opposite the output end of the motor is altered in some way, say in diameter, or type of metal, or length. Then, since the motor is symmetrical in the transducer and flange region and since the median plane of the transducer is a nodal plane of motion, it follows that the momentum of the half bar $a$ is equal and opposite to the momentum of the half bar $b$. As long as the half bars are identical the output peak velocities will be identical. But, in general, the peak momentum (we will take the case of compressional waves for simplicity, though the reasoning is not so limited) of a half bar, which corresponds closely to a quarter wavelength in the material of said half bar at the resonance frequency of the motor is equal to $(2M/\pi)V_o$ If we use 1 and $r$ subscripts to designate left and right half bars respectively then we have (1a) $(M_l/\pi)V_l = (M_r/\pi)V_r$ (1b) or $M_l V_l = M_r V_r$ or $\overline{M}_l = \overline{M}_R$ where $\overline{M}$ = momentum where $M_l$ and $M_r$ are left and right half bar masses and $V_l$ and $V_r$ are left and right peak velocities respectively. But in a practical case we are interested in a specified value of $V_l$ and so the value of $V_r$ is not critical to the motor operation. However, in those cases where $M_r$ is made to be different from $M_l$ for special regulatory or monitoring reasons, we can easily show how the distribution of peak kinetic energy is affected. The left half bar peak kinetic energy is $(\frac{1}{4})M_l V_l^2$, while the right half bar peak kinetic energy is $(\frac{1}{4})M_r V_r^2$. The sum $(\frac{1}{4})(M_l V_l^2 + M_r V_r^2)$ is a constant. This sum may be written from the momentum equation as $(\frac{1}{4})(\overline{M}_l V_l + \overline{M}_r V_r)$, or (2)  $\overline{M}_l V_l + \overline{M}_r V_r = K$ = constant This is true as long as the cross section of the crystal is large compared with the cross section of the half bar, and so long as the half bar is substantially a $\eta/4$ section at the operating frequency. Equations (1) and (2) are sufficient to determine $V_r$ when $V_l$ is specified and the masses of the right and left half bars are known. Furthermore, it is of design interest to note that for constant cross sections it is easy to show (3) $$\frac{M_l}{M_r} = \frac{D_l C_l A_l}{D_r C_r A_r} = \frac{Z_l}{Z_r}$$

where D, C, A are respectively density, elastic wave speed, and cross section area. Also Z is the mechanical impedance equal to DCA. One further item of interest is to see how the peak kinetic energy distribution is affected by alteration in the right half bar. From equations (1), (2) and (3) it follows that (4a)  Peak $KE$ in left half bar $$= \frac{\overline{M}_l}{\overline{M}} \text{ (peak } KE \text{ in both half bars)}$$

(4b)  Peak $KE$ in right half bar $$= \frac{\overline{M}_r}{\overline{M}} \text{ (peak } KE \text{ in both half bars)}$$

(5) $$\frac{\text{Peak } KE \text{ in left half bar}}{\text{Peak } KE \text{ in right half bar}} = \frac{V_l}{V_r} = \frac{M_r}{M_l} = \frac{Z_r}{Z_l}$$

Thus, depending on whether rear section alteration in design produces a relative increase or decrease in the mass of the section relative to the output section, it is seen that a corresponding increase or decrease in the amount of peak kinetic energy will occur in the motor output section. We have now provided all the important broad design principles for motors of the type disclosed in this invention, where the left and right sections are approximate quarter wavelength sections. Theoretical investigation shows that a given section will be closely equal to a quarter wavelength at the motor design frequency so long as the cross-sectional area of the transducer is substantially larger than the cross-sectional area of the given section. Since this is so in all preferred embodiments of the invention, the design of such motors is made extremely simple. If the cross section of the section approaches or exceeds the cross section of the transducer, then the length of the section is significantly less than a quarter wave length. A further condition of good design for motors of the invention requires that the thickness of the transducer plus the thickness of the half-bar flanges be substantially less than a quarter wavelength in the materials involved.

Although the flanged half-bar construction is preferred for the type of motor shown in FIG. 5, there is a still simpler design which should be mentioned, especially since it is susceptible to fairly accurate mathematical analysis.

FIG. 6 illustrates the motor of FIG. 5 without the flanges. This results in a discontinuity of stress across the transducer half-bar interface. It is the force which is continuous across the boundary. But the force in the transducer is the transducer stress $x$ at the boundary times the transducer cross section $Ax$. The force in the bar at the boundary is the half-bar stress at the boundary times the cross section of the half-bar at the boundary, ($A_l$ for left half-bar and $A_r$ for right half-bar). Therefore:

(6) $\quad SxAx = S_l A_l = S_r A_r$ or $$S_l = \left(\frac{Ax}{A_l}\right) Sx; \quad S_r = \left(\frac{Ax}{A_r}\right) Sx$$

Thus, if we excite the transducer to an allowable stress, $Sx$, we set up a higher stress $S_l$ (and $S_r$) in the half-bar interfaces. Currently there are no known cements which could support the $S_l$ and $S_r$ stresses which would be created for a large output peak velocity $V_1$. In the case of ultrasonic motors large peak velocities correspond to a range of speed from about 5 ft./sec. to 100ft./sec. In order to make a practical motor of the type of FIG. 6, we must introduce another element, often found in the current art of sandwich ultrasonic motor construction. This element is none other than a bolting addition which permits compression of the transducer between the two half-bar interfaces. The simplest form of bolting is accomplished by using a transducer with a central clearance hole through which a threaded bolt is passed. Then the two half-bars are screwed onto the two threaded ends of the bolt. To facilitate compliancy soft-metal thin washers are interposed between the half-bar faces and the transducer faces. FIG. 7 shows this modification.

Now, although we have consistently shown the symmetrical form of the ultrasonic motor-type of this invention, we have also indicated that the section opposite the output section might be modified as to material, length or cross section and in other ways for regulating or monitoring purposes. Therefore, in FIG. 7 we have indicated the various relevant dimensions and data for the case of a motor operating with compressional waves of longitudinal vibrations. If we assume the nodal plane of standing waves (with antinodes at the outer ends of the two half-bars) to coincide with the median plane of the transducer, i.e. along $a$–$a$, then we can write down the design equations for such a motor. They are as follows:

where $Y_x$ = transducer elastic modulus
$Y$ = left half-bar elastic modulus
$Y_r$ = right half-bar elastic modulus
$Z_x = \rho_x A_x C_x$
$Z_1 = \rho_1 A_1 C_1$
$Z_r = \rho_r A_r C_r$
$Z_x \cos(\pi L_x/\lambda_x) = Z_1 \tan(2\pi L_1/\lambda_1) = Z_r \tan(2\pi L_r/\lambda_r)$
$(V_1/V_{max}) \cos(2\pi L_1/\lambda_1) = (V_r/V_{max}) \cos(2\pi L_r/\lambda_r)$
(7) $(V_1/V_{max})^2 = (Z_x/Z_1)^2 (\pi_0/Af_0) + \cos(\pi L_x/\lambda_x)^2 + \sin^2(\pi L_{a0} \tfrac{2}{3}\lambda_x)$
$(V_r/V_{max})^2 = (Z_x/Z_r)^2 [\pi_0/\delta_0 + \cos(\pi L_x/\lambda_x)]^2 + \sin^2(\pi L_x/\lambda_x)$ where $\lambda_1$ = wave length of compressional waves in left half-bar for motor frequency, $f$.
$\lambda_R$ = wave length of compressional waves in right half-bar
$\lambda_x$ = wave length of compressional waves in transducer
$\delta_0 = (\overline{Y}_x V_{max})/C_x = Z_x V_{max}; Z_x = (\overline{Y}_x/C_x) = Z_x/A_x$
$\pi_o$ = peak alternating piezoelectric stress generated in the transducer
$\delta_o = \overline{Y}_x S_{max}$, so that $S_{max} = (V_{max}/C_x)$
$S_{max}$ = peak elastic strain in median plane of transducer
$V = C_x S$ So we note that $V_{max}$ is really the peak velocity which would occur at the end of a half wavelength transducer bar, totally composed of the transducer material, having uniform cross section and with the same peak strain as is present in the FIG. 7 motor's transducer. This is a convenient concept because we can then regard $(V_1/V_{max})$ as the amplifying power of the ultrasonic motor of FIG. 7. It is obvious from the design equations that $V_r = V_1$ if the two half-bars are the same. Furthermore, investigation shows that in equation (7) a good approximation exists for $(V_1/V_{max})$ whenever $(Z_x/Z_1)$ and $(Z_x/Z_r)$ are substantially greater than one. This is approximately true even for the case where the impedance ratios are equal to or greater than two. Furthermore, for this type of motor $L_x$ is selected to be no greater than $(\lambda_x/8)$. With these conditions it also turns out that $L_1$ and $L_r$ are approximately equal to $(\lambda_1/4)$ and $(\lambda_r/4)$ respectively. The greater the ratio of $(Z_x/Z_1)$ and $(Z_x/Z_r)$ the more closely is $L_1$ and $L_r$ each equal to $(\lambda_1/4)$ and $(\lambda_r/4)$. But, even if the right-hand section does not satisfy the impedance ratio conditions set, the left-hand section length will be determined essentially by $(Z_x/Z_1)$ alone. This is a consequence of the first of the design equations, (7). Thus, in all cases for this type of motor, since we must select $A_x$ substantially larger than $A_1$, and so $Z_x$ substantially larger than $Z_1$, it is a simple design fact that $L_1$ will be fairly closely equal to $\lambda_1/4$.

For example, if we have a left half-bar of aluminum alloy whose compressional wave speed, $C_1 = 200 + 10^3$ inches/sec. and if the operating frequency of the motor is 20 Kc./sec. then
$\lambda_1 = C_1/fax(200/20) = 10$ inches
and so
$\lambda_1/4 = 2.5$ inches.

Thus we see how beautifully simple is this part of the design problem. In actual practice one would select the left and right half bars each equal to their respective $\lambda/4$ values. Then the motor would be assembled and activated at its fundamental longitudinal resonant frequency of vibrations (i.e. one node and two loops). This frequency would prove to be slightly higher than the selected frequency of design. Then, by merely trimming the lengths $L_1$ and $L_r$ in fine steps one can bring the motor as close as one wishes to the desired operating frequency.

Now, although we have been speaking of FIG. 7, the design procedure just outlined also applies to FIG. 5, provided that the transducer thickness plus the flange thicknesses are no larger than $(\lambda/8)$. This will also be so if in FIG. 5 we resort to peripheral or central bolting techniques to sandwich the transducer, instead of using cement. Thus, it is evident that the present invention herein disclosed, permits very simple design procedure to obtain suitable dimensions for a practical case.

Having laid the broad foundation for the methods of this invention in designing new types of ultrasonic motors, we can proceed to additional specific types of such motors, in order to understand that the motor support means are very much dictated by the use to which the motor will be put. For example, the following specifications may have to be met in different cases.

1. Miniature motors and hand held motors.
2. Motors mounted so as to be freely rotating.
3. Motor mounts permitting ready attachment to presses, arbors, machine tool housing, and machinery in general.
4. Special purpose motors.

In general, the art of mounting vibratory motors, especially in the sonic and ultrasonic ranges, requires proper attendance to such details as avoidance of motor vibration damping due to the support, and avoidance of undue transmission of vibrations to unwanted regions. This is not a new art and many solutions to the mounting problems have been developed. It is the intention in this invention to make use of any and all such support means improvements as may be needed in a particular case. In cases where the rigidity of the mounting is not essential to the intended use of the motor, highly compliant mounts are recommended, such as may be provided by rubber gaskets, rubber O-rings, and bellowslike highly compliant metal structures. In the case of rigid mounting, use may be made of various arrangements involving bolting the motor supports to suitable areas at or near the nodal portion of the motor. In general, for rigid mounting one can bolt to many nonnodal parts of the motor provided the support means include a quarter wave length section, which serves to isolate the vibrations at the region of attachment from the main external support of the motor. A number of specific examples of embodiments of the invention will be described so as to indicate the broad range of motor-types encompassed. Although it will be appreciated that since the invention is for a basic new generic type of compact, high output motor, the number of possibilities is inexhaustible. Therefore, the cited examples will be by way of showing great variety rather than to exhaust the possibilities.

Figure 8:
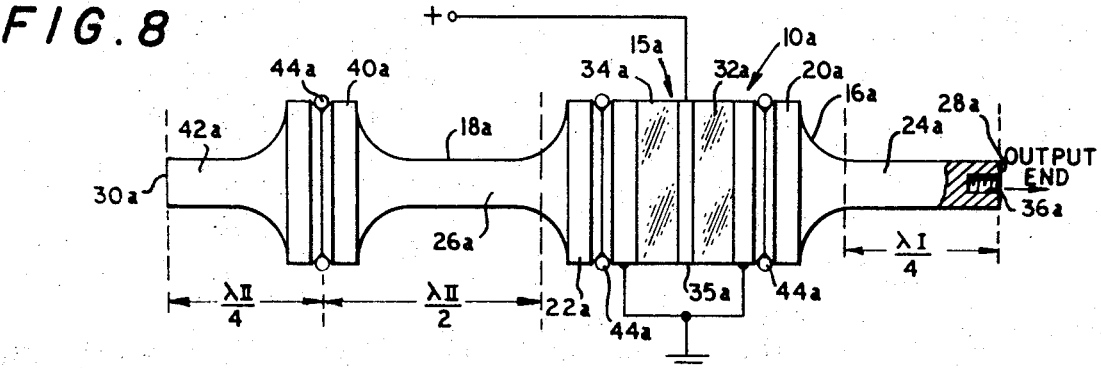
FIG. 8—14 inclusive, illustrate various motor constructions in accordance with the invention.

FIG. 8 is another form of motor 10a in which the transducer means 15a may include two piezoelectric wafers or disc, which may be referred to as the front disc 32a and rear disc 34a separated by an electrode 35a electrically connected to a power source in a conventional manner. The transducer means 15a may be located at, or in the region of a node of longitudinal vibration of the motor 10a. The piezoelectric discs may be of commercially available PZT–4 material from the Clevite Corporation. The front disc 32a is directly connected to the metallic output transmission section 16a which includes a flanged portion 20a, which may have a circular cross section substantially equal to that of the circular cross section of the crystal 32a, with an elongated output portion 24a of a reduced diameter. The axial length of the elongated portion 24a may be of a quarter wavelength at the frequency of vibration of the overall motor. The output end 28a has a threaded opening 36a extending therein to accommodate a tool or other member conventionally secured thereto. The discs 32a and 43a, electrode 35 and transmission sections 16a and 18a may be secured or bonded together with an epoxy cementing compound.

The rear transmission section 18a has its flanged portion 22a merging by a radius with the elongated portion 26a which in turn merges by a radius with a supporting flanged portion that at its opposite end merges with an elongated portion 42a terminating in the free end 30a of the motor. The elongated portion 26a extends to the rear surface 30a and has an axial length which corresponds to approximately three quarters of a wavelength in the material of the section for elastic waves of the type produced by the motor and for its operating frequency. The elongated portion 26a is uniform in cross section except for the narrow flange region 40a distant by one quarter wavelength from the output end 30a of the section.

Supporting means is provided in the form of vibration isolating means to support the motor in a relatively fixed support without acoustically loading the same. As seen in FIG. 8 an O-ring 44a of a resilient material such as rubber is provided in a radially extending seat in the flanged or enlarged sections. The longitudinal length of the sections is such that the distance from the O-ring 44a in the flanged portion 40a to the rear free end 30a is approximately a quarter wavelength and the distance to the next O-ring mounting is approximately a half wavelength. The O-ring may be positioned at substantially a node of longitudinal vibration of the motor.

Figure 9:
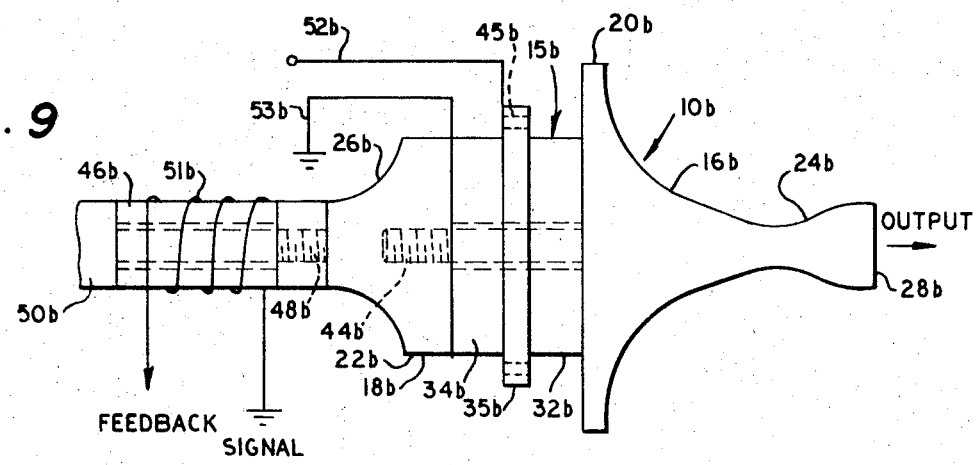

FIG. 9, illustrates a form of motor 10b in which the respective portions thereof are joined together by connecting means in the form of a threaded bolt 44b. The bolt 44b may extend from the output transmission section 16b with its flanged portion 20b having a greater cross-sectional area than the disc 32b of the transducer means 15b. The elongated portion 24b from the flanged section 20b to the output free end 28b may vary in shape for various reasons, as for example, amplitude magnification, but the average cross-sectional area of the elongated portions 24b and 26b are substantially less than the cross section of the transducer means 15b in the form of the discs 32b and 34b. The electrode 35b may extend past the outside diameter of the crystals and have holes extending therethrough to aid in cooling the motor 10b. The stud 44b terminates in the rear transmission section 18b which has a flanged portion 22b terminating in an elongated portion 26b.

To provide automatic frequency control an electrostrictive member 46b may be coupled by a bolt 48b extending therethrough into a rear member 50b. A coil 51b surrounds the electrostrictive member 46b such that a feedback electrical signal is transmitted to the generator to control the power transmitted to the motor 10b by power lead 52b with the ground lead 53b coupled to the motor. The flanged sections 20b and 22b may be formed from the same or different materials, such as aluminum and titanium.

Figure 10:
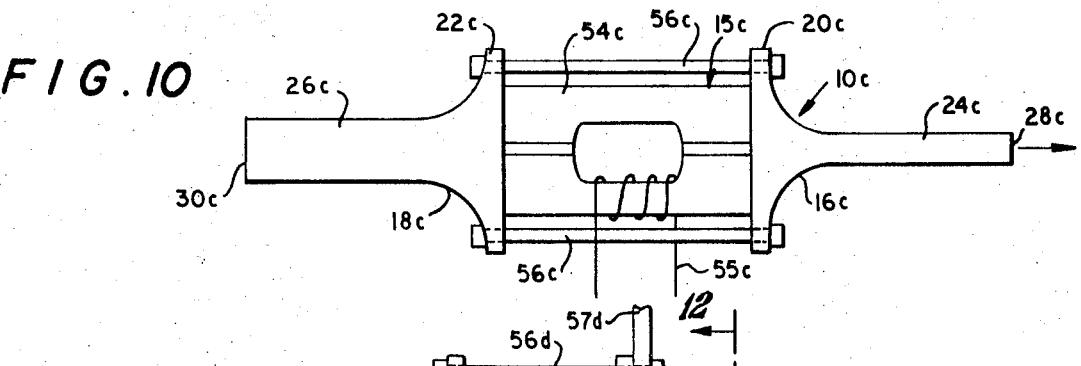

FIG. 10, illustrates an ultrasonic motor 10c in which the transducer means 15c is of a magnetostrictive material in the form of a plurality of laminations 54c with a coil winding 55c thereabout which is connected to a power source not shown. The transducer 15c is sandwiched between an output transmission section 16c and rear transmission section 18c and retained in fixed position by means of a series of studs or bolts 56c which pass through matching holes arranged circumferentially around the periphery of the flanged portions 16c and 18c. The output section 16c has an elongated portion 24c extending therefrom and terminating in its output end 28c. In a like manner the elongated portion 26c terminates in a rear free end 30c, and the average cross section of each of the elongated portions 24c and 26c is substantially less than the cross section of the transducer means 15c.

Figure 11:
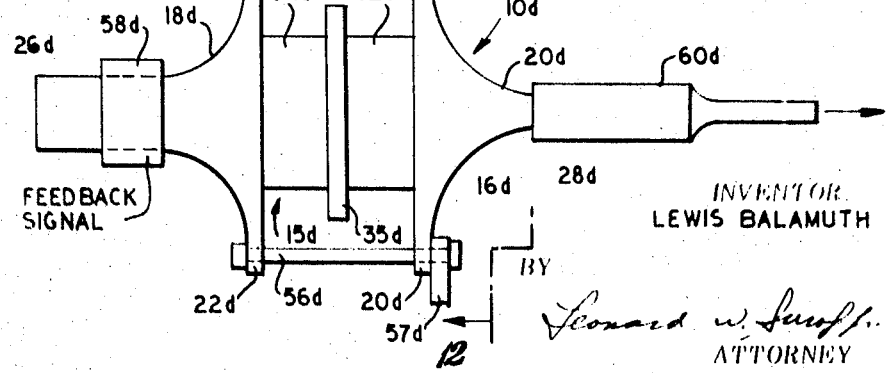
Figure 12:
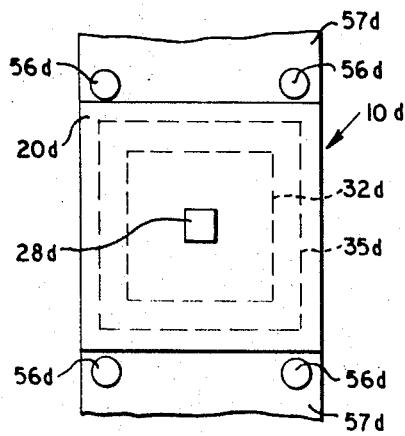

FIGS. 11 and 12, illustrate motor 10d in which the transducer means 15d consisting of discs 32d and 34d are of a rectangular configuration as well as the electrode 35d. A rectangular configuration is also adaptable to the flanges 20d and 22d of the output transmission section 16d and rear transmission section 18d, as well as the elongated portion 20d and elongated portion 22d. The rectangular configuration permits the construction of bladelike motors in which the free end 28d may extend in length transversely to the direction of vibration several inches or feet so as to transmit vibrations over an extended plane.

The coupling means may include a plurality of studs 56d extending between the parallel spaced apart flanges. Mounting means may be provided in the form of supports 57d that abut the flange 20d and retained in place by the stud head. A feedback signal pickup 58d is shown to extend around the elongated portion 26d to maintain the power required. A tool member 60d is connected to the free end 28d for transmitting the vibratory energy to a desired location and may be connected by means of a thread (not shown) to the transmission section 16d.

Figure 14:
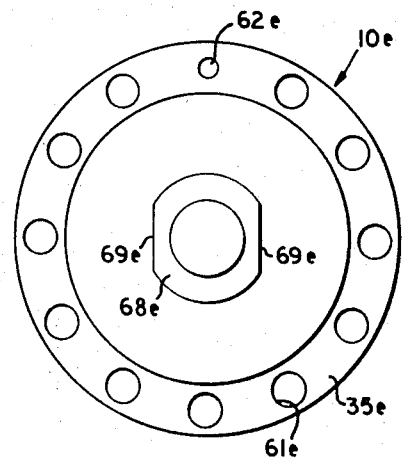
Figure 13:
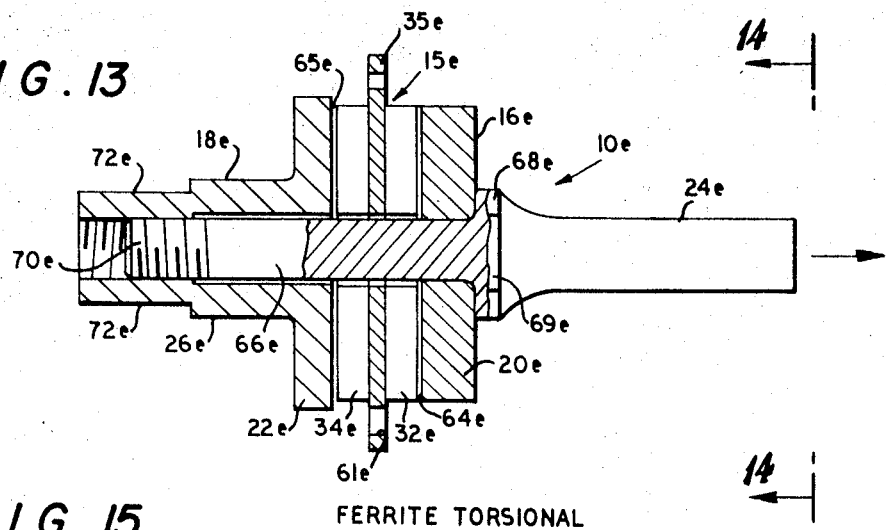

FIGS. 13 and 14, illustrate another motor 10e in which the transducer means 15e includes piezoelectric discs 32e and 34e with an electrode 35e therebetween. The electrode 35e as seen in FIG. 14 may include a plurality of apertures 61e for cooling purposes. The electrode lead may be secured to the electrode by means of the taped hole 62e provided for that purpose. The transmission section 16e may include a flanged portion 20e which may be secured to the disc 32e by an epoxy layer of material 64e and the other disc 34e secured by an epoxy layer of material 65e. The inner diameter of the discs 32e, 34e and electrode 35e provide a clearance for the shaft 66e extending therethrough. The shaft 66e may be integrally formed with the elongated portion 24e that has a neck 68e that abuts the front face of the flanged portion 20e and has a pair of flats 69 e for a wrench in assembling the motor 10e. The shaft 66e has a threaded rear portion 70e that mates with threads provided in the rear transmission section 18e which has the flanged section 22e abutting the disc 34e with its circular elongated portion 26e having gripping means in the form of flats 72e thereon so that when the flats 69e and 72e are held the motor may be assembled with the necessary torque applied thereto.

In this form the combined axial length of the transducer means 15e and each of the flanged portions 20e and 22e are less than the axial length of either of the elongated portions 24e and 26e. In addition the length of the elongated portions 24e and 26e may each be substantially equal to an odd number of quarter wavelengths. The wavelengths being those appropriate to the material of each transmission section and to the type of wave which is being propagated by the motor 10e, and corresponding to the frequency of operation of the motor.

Figure 15:
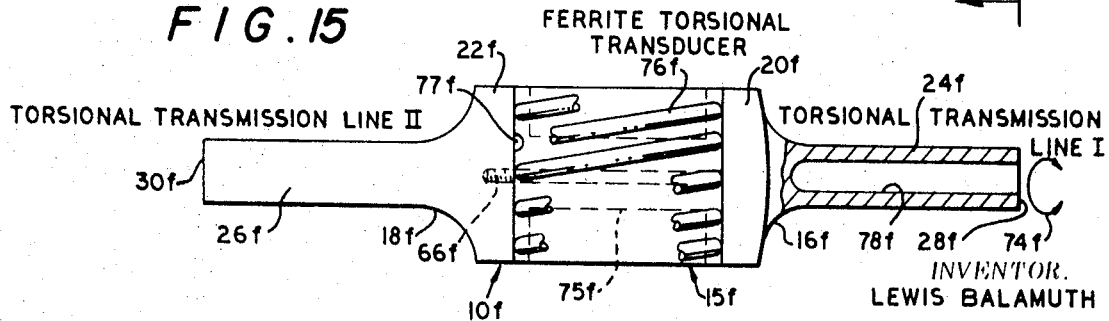
FIG. 15, illustrates a transducer designed to obtain torsional vibrations.

FIG. 15, illustrates the invention in which the motor 10f is designed to vibrate torsionally as seen by the arrow 74f at its output end 28f. The magnetostrictive transducer means 15f may consist of elements 75f which may be permanent ferrite magnets, sandwiched between the flanges 20f and 22f of the transmission sections 16f and 18f respectfully. The ferrite magnets may be symmetrically placed with a coil winding 76f that extends in the longitudinal plane and at its opposite faces extends in a groove 77f, the coil is then connected to a power source in a conventional manner. A bolt 66f threaded at one end secures the transmission sections together.

The elongated portion 24f may have an axially extending passageway 78f extending therein a desired distance. With this design the free end 28f or the elongated portion 24f will vibrate torsionally.

In this form of the invention, as well as illustrated in FIG. 5, the transmission sections 16f and 18f are the same as to flange portion diameter, flange thickness and shape of the elongated portions 24f and 26f of the transmission sections.

CONCLUSION

Essentially, the invention describes an ultrasonic motor, whose transducer section has an average cross section substantially larger than the average cross section of the front and rear section of the motor. The unique advantages of this design are:

1. The peak dynamic stress in the transducer section is substantially less than the peak stress in either narrowed end section of the motor.
2. The total power input to the transducer may be sufficient to produce relatively large output velocities in the motor output sections at relatively low field intensity, due, in part, to the enlarged volume and cross section of the transducer, while relatively, a small mass per unit length is in the output.
3. The reduced operating field intensity and the relative large volume of the transducer enable air-cooled operation of the motor even without benefit of fans.
4. No special amplifying horn design is needed in the motor in order to achieve the large output velocities obtained.
5. One of the reduced cross section parts of the motor may be used for providing a feedback signal for automatic motor control operation.

Thus, it may be appreciated that the new basic motor design, although very simple, actually takes simultaneous advantage of a number of cooperating factors, not found in the prior art, in order to obtain a practical working motor of high output and low dissipation and relatively low operating temperature (i.e. temperatures without air circulation of less than 250° F.) and it is feasible to make designs for which the stable operating temperature allows miniature hand held motors to be operated with manual comfort.

Effects of the kind described can be produced and be useful for transducer to output average cross section ratios as low as approximately 1.75. Very large effects may be obtained for values of said ratio in the approximate range from 4 to 25. Accordingly, ultrasonic motors may be constructed having a ratio between the average transducer cross section and that of the average cross section of the elongated portions in the range of approximately 1.75 to 25.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention.

I claim:

1. An ultrasonic motor, comprising:
   A. transducer means,
   B. two transmission sections each including a flanged portion at one end thereof and an elongated portion extending therefrom, the average cross section of each of said elongated portions is substantially less than the cross section of said transducer means, and
   C. means rigidly coupling said transducer means to said transmission sections with said respective flanged portions in substantial engagement with said transducer means.

2. An ultrasonic motor as defined in claim 1, wherein the ratio between the average cross section of said transducer means and said elongated portions is equal to at least 1.75.

3. An ultrasonic motor as defined in claim 1, wherein the ratio between the average cross section of said transducer means and said elongated portions is in the range of 4 to 25.

4. An ultrasonic motor as defined in claim 1, wherein said transducer means is of a piezoelectric material.

5. An ultrasonic motor as defined in claim 4, wherein said transducer means includes a pair of piezoelectric discs each engaging a flanged section with an electrode therebetween.

6. An ultrasonic motor as defined in claim 1, wherein said coupling means includes an epoxy joining said transducer means to said flanged portions.

7. An ultrasonic motor as defined in claim 1, wherein said coupling means includes a central bolt which serves to compress said transducer means between the flanged portions of the transmission sections.

8. An ultrasonic motor as defined in claim 1, wherein said coupling means includes a series of bolts which pass through matching holes arranged circumferentially around the periphery of said flanged portions.

9. An ultrasonic motor as defined in claim 1, wherein the combined axial length of said transducer means and each of said flanged portions is less than the axial length of either of said elongated portions.

10. An ultrasonic motor as defined in claim 1, wherein the length of the elongated portion of each of said transmission sections is substantially equal to an odd number of quarter wavelengths, said wavelengths being those appropriate to the material of each transmission section and to the type of wave which is being propagated by the motor, and corresponding to the frequency of operation of said motor.

11. An ultrasonic motor as defined in claim 1, wherein said transmission sections are substantially the same as to flange portion diameter, flange portion thickness, and shape of the elongated portion of said transmission sections.

12. An ultrasonic motor as defined in claim 1, wherein said flanged portions are composed of the same material.

13. An ultrasonic motor as defined in claim 1, wherein said flanged portions are composed of different materials.

14. An ultrasonic motor as defined in claim 1, wherein said elongated portions have rectangular cross sections.

15. An ultrasonic motor as defined in claim 1, wherein said transducer means is of a magnetostrictive material.

16. An ultrasonic motor as defined in claim 1, wherein said transducer means is a magnetostrictive ferrite transducer comprising a pair of sandwiched permanent ferrite magnets, and a symmetrically placed transverse opening receiving the winding of a coil of wire, said coil capable of being energized by an applied alternating current in its winding.

17. An ultrasonic motor as defined in claim 1, wherein said elongated portions are of uniform cross sections and are blended into the flanged portion by means of a finite radius.

18. An ultrasonic motor as defined in claim 1, wherein one of said output transmission sections has an elongated portion whose length corresponds to approximately three quarters of a wavelength in the material of the section for elastic waves of the type produced by said motor and for the operating frequency of said motor, and wherein said elongated portion is uniform in cross section except for a narrow region distant by approximately one quarter wavelength from the output end of said section, in said narrow region a flange is provided, to be used in the mounting structure of said motor.

19. An ultrasonic motor as defined in claim 1, and further including means operatively associated with one of said transmission sections for mounting same.

20. An ultrasonic motor as defined in claim 19, wherein said mounting means includes an O-ring.

21. An ultrasonic motor as defined in claim 19, wherein said mounting means is located substantially at a nodal plane of longitudinal vibration.

22. An ultrasonic motor as defined in claim 1, and further including sensing means operatively associated with one of said transmission sections for monitoring the amplitude of vibration.

23. An ultrasonic motor, comprising:
   A. transducer means including a pair of piezoelectric discs with an electrode therebetween,
   B. two transmission sections each including a flanged portion at one end thereof for engagement with a respective disc, and an elongated section extending therefrom, the average cross section of each of said elongated portions is substantially less than the average cross section of said transducer means, said cross section difference having a ratio within the range of 1.75 to 25, and C. means rigidly coupling said transducer means to said flanged portions to compress the discs therebetween, said coupling means includes at least one threaded member which extends between said transmission sections and serves to compress said transducer means between said flanged portions.

24. An ultrasonic motor as defined in claim 23, wherein said coupling means further includes an epoxy joining said transducer means to said flanged portions.

25. An ultrasonic motor as defined in claim 23, wherein said coupling means includes a series of bolts which pass through matching holes arranged circumferentially around the periphery of said flanged portions.

26. An ultrasonic motor as defined in claim 23, wherein the combined axial length of said transducer means and each of said flanged portions is less than the axial length of either of said elongated portions.

27. An ultrasonic motor as defined in claim 23, wherein the length of the elongated section of each of said flanged portions is substantially equal to an odd number of quarter wavelengths, said wavelengths being those appropriate to the material of each transmission section and to the type of wave which is being propagated by the motor, and corresponding to the frequency of operation of said motor.

28. An ultrasonic motor as defined in claim 23, wherein said transmission sections are substantially the same as to flange portion diameter, flange portion thickness and shape of the elongated portion of said sections.

29. An ultrasonic motor as defined in claim 23, and further including means operatively associated with one of said transmission sections for mounting same.

30. An ultrasonic motor as defined in claim 29, wherein said mounting means includes an O-ring.

31. An ultrasonic motor as defined in claim 29, wherein said mounting means is located substantially at a nodal plane of longitudinal vibration.

32. An ultrasonic motor as defined in claim 23, and further including sensing means operatively associated with one of said transmission sections for monitoring the amplitude of vibration.